United States Patent
Motegi et al.

(10) Patent No.: US 11,960,056 B2
(45) Date of Patent: Apr. 16, 2024

(54) OPTICAL LENS AND METHOD FOR MANUFACTURING SAME

(71) Applicant: MITSUBISHI GAS CHEMICAL COMPANY, INC., Tokyo (JP)

(72) Inventors: Atsushi Motegi, Tokyo (JP); Kentaro Ishihara, Tokyo (JP); Katsushi Nishimori, Tokyo (JP); Shinya Ikeda, Tokyo (JP); Noriyuki Kato, Tokyo (JP); Mitsuteru Kondo, Tokyo (JP); Kensuke Oshima, Tokyo (JP); Masahiro Kanda, Tokyo (JP); Shoko Suzuki, Tokyo (JP); Tatsunobu Ogata, Tokyo (JP); Mitsutake Suematsu, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 516 days.

(21) Appl. No.: 17/416,730

(22) PCT Filed: Dec. 24, 2019

(86) PCT No.: PCT/JP2019/050451
§ 371 (c)(1),
(2) Date: Jun. 21, 2021

(87) PCT Pub. No.: WO2020/138013
PCT Pub. Date: Jul. 2, 2020

(65) Prior Publication Data
US 2022/0043183 A1     Feb. 10, 2022

(30) Foreign Application Priority Data
Dec. 28, 2018  (JP) .................... 2018-247927

(51) Int. Cl.
*G02B 1/04*     (2006.01)
*C08L 25/02*    (2006.01)
(Continued)

(52) U.S. Cl.
CPC .............. *G02B 1/041* (2013.01); *C08L 25/02* (2013.01); *G02B 3/00* (2013.01); *G02B 7/02* (2013.01);
(Continued)

(58) Field of Classification Search
CPC . G02B 1/041; G02B 3/00; G02B 7/02; G02B 2003/0093; G02B 5/003;
(Continued)

(56) References Cited

U.S. PATENT DOCUMENTS 6,365,782 B1   4/2002   Nakamura et al.
2008/0290435 A1  11/2008  Oliver et al.
(Continued)

FOREIGN PATENT DOCUMENTS

EP   2 466 341 A1   6/2012
JP   2001-10999 A   1/2001
(Continued)

OTHER PUBLICATIONS

Partial Supplementary European Search Report issued in corresponding European Patent Application No. 19903119.6 dated Feb. 25, 2022.
(Continued)

*Primary Examiner* — James C. Jones
(74) *Attorney, Agent, or Firm* — GREENBLUM & BERNSTEIN, P.L.C.

(57) ABSTRACT

Provided is an optical lens formed by integrally molding a lens part that is an optically effective portion and has a light incidence/emission surface, and a lens edge part that is an optically ineffective portion and has a surface thereof except
(Continued)

the light incidence/emission surface. The lens edge part includes a non-transparent region in part or all thereof, the lens part and the lens edge part include a thermoplastic resin, and the non-transparent region in the lens edge part contains a total of 0.1-5 mass % of one or more of a black dye and a black pigment.

7 Claims, 2 Drawing Sheets

(51) Int. Cl.
 *G02B 3/00* (2006.01)
 *G02B 7/02* (2021.01)
(52) U.S. Cl.
 CPC ....... *C08L 2201/10* (2013.01); *C08L 2203/20* (2013.01); *G02B 2003/0093* (2013.01)
(58) Field of Classification Search
 CPC ......... G02B 5/005; G02B 7/022; C08L 25/02; C08L 2201/10; C08L 2203/20; C08L 65/00; B29C 31/008; B29D 11/00009; C08K 3/013
 See application file for complete search history.

(56) References Cited

U.S. PATENT DOCUMENTS

| | | |
|---|---|---|
| 2012/0134028 A1 | 5/2012 | Maruyama |
| 2014/0246566 A1 | 9/2014 | Maruyama |
| 2016/0244389 A1 | 8/2016 | Nakamura et al. |
| 2017/0276839 A1* | 9/2017 | Teramoto ............... G02B 5/003 |
| 2019/0049737 A1 | 2/2019 | Terai et al. |
| 2019/0241703 A1 | 8/2019 | Kato et al. |
| 2020/0224025 A1 | 7/2020 | Hirakawa et al. |
| 2020/0354516 A1 | 11/2020 | Kato et al. |

FOREIGN PATENT DOCUMENTS

| | | |
|---|---|---|
| JP | 2001-11008 A | 1/2001 |
| JP | 2008-276059 A | 11/2008 |
| JP | 2011-164284 A | 8/2011 |
| JP | 2012-073403 A | 4/2012 |
| JP | 2013-114103 A | 6/2013 |
| JP | 2018-146878 A | 9/2018 |
| TW | 201525529 A | 7/2015 |
| WO | 2008/096822 A1 | 8/2008 |
| WO | 2015/060343 A1 | 4/2015 |
| WO | 2018/016516 A1 | 1/2018 |
| WO | 2018/181157 A1 | 10/2018 |

OTHER PUBLICATIONS

Extended European Search Report issued in European Patent Application No. 19903119.6 dated Jul. 18, 2022.
International Search Report issued in International Patent Application No. PCT/JP2019/050451, dated Mar. 3, 2020, along with English translation thereof.
Written Opinion of the International Searching Authority issued in International Patent Application No. PCT/JP2019/050451, dated Mar. 3, 2020, along with English translation thereof.

* cited by examiner

[Figure 1]
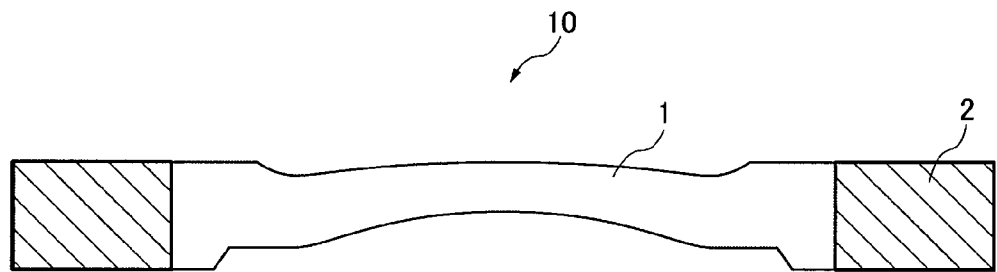
[Figure 2]
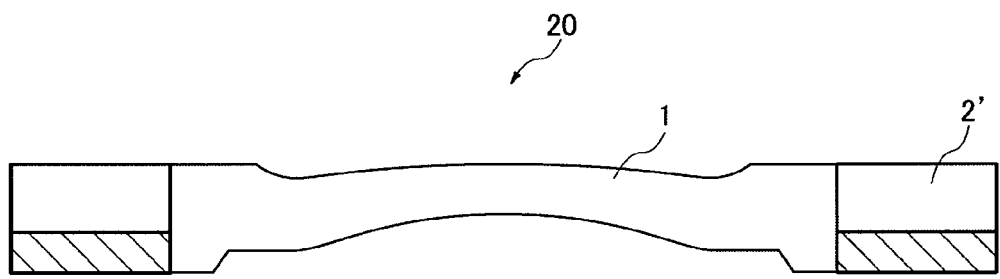
[Figure 3]
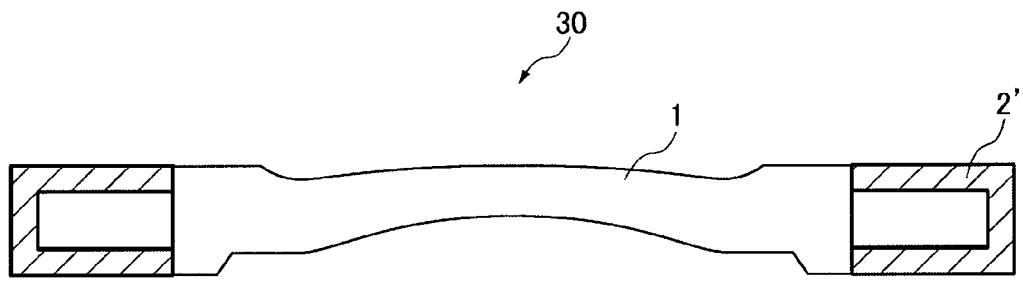

[Figure 4]
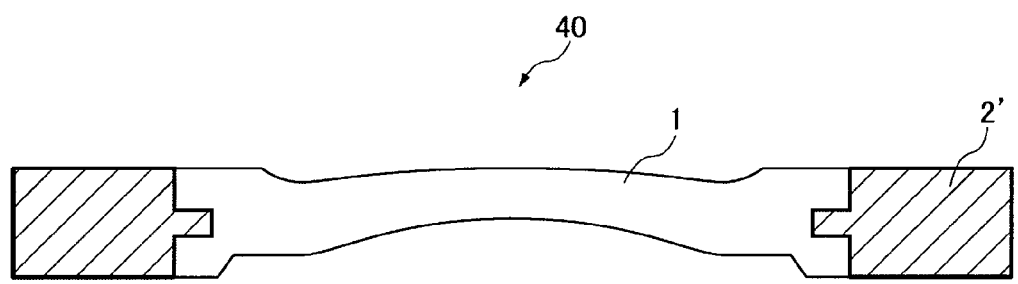
[Figure 5]
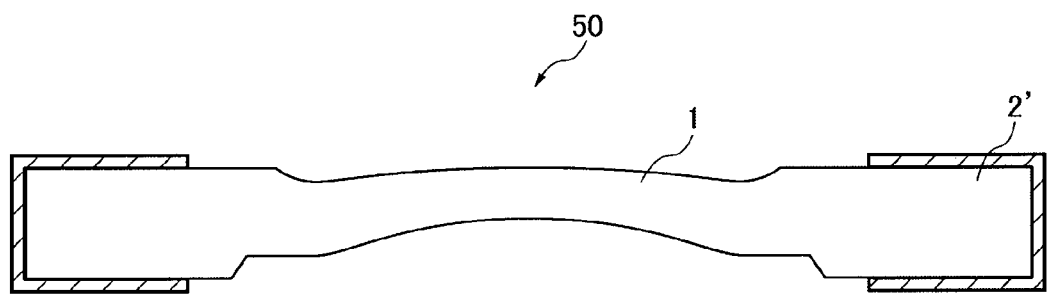
[Figure 6]
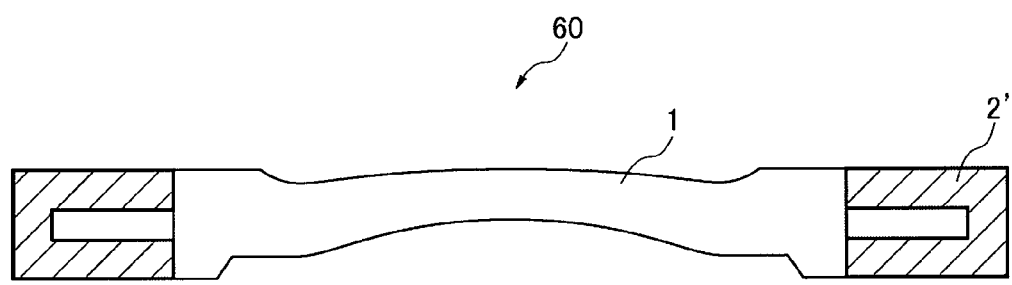

OPTICAL LENS AND METHOD FOR MANUFACTURING SAME

TECHNICAL FIELD

The present invention relates to an optical lens, by which thickness reduction and size reduction of an optical lens unit can be realized and light leakage due to reflected light at the interface can be reduced, a method for producing the same, and an optical lens unit comprising the optical lens.

BACKGROUND ART

Since size reduction/thickness reduction of mobile terminals has been promoted and mobile terminals have become popular, further size reduction/thickness reduction of optical lens units to be installed therein has also been desired, and the productivity has been desired.

Conventionally, a spacer is additionally sandwiched between lenses for the purpose of antireflection and light shielding (Patent Document 1). However, when there is a difference in refractive index between lenses and a spacer, surface reflection occurs, and reflected light causes light leakage.

PRIOR ART DOCUMENTS

Patent Documents

Patent Document 1: Japanese Laid-Open Patent Publication No. 2018-146878

SUMMARY OF THE INVENTION

Problems to Be Solved by the Invention

The problem to be solved by the present invention is to provide an optical lens, by which thickness reduction and size reduction of an optical lens unit can be realized and light leakage due to reflected light at the interface can be reduced.

Means for Solving the Problems

The present inventors diligently made researches and found that the above-described problem can be solved by providing a specific non-transparent region in a lens edge part of an optical lens.

Specifically, the present invention is as described below.
<1> An optical lens formed by integrally molding a lens part that is an optically effective portion and has a light incidence/emission surface, and a lens edge part that is an optically ineffective portion and has a surface thereof except the light incidence/emission surface, wherein:
the lens edge part includes a non-transparent region in part or all thereof;
the lens part and the lens edge part include a thermoplastic resin; and
the non-transparent region in the lens edge part contains 0.1 to 5% by mass in total of one or more of a black dye and a black pigment.
<2> The optical lens according to item <1>, wherein the thermoplastic resin included in the lens part includes at least one selected from the group consisting of: a structural unit represented by formula (1):

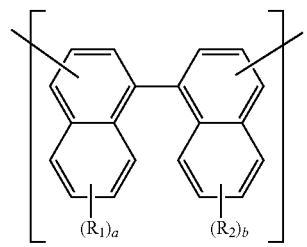

wherein in formula (1),
$R_1$ and $R_2$ each independently represent a hydrogen atom; a fluorine atom; a chlorine atom; a bromine atom; an iodine atom; a $C_{1-6}$ alkyl group; a $C_{6-20}$ aryl group which may contain a heterocyclic atom selected from among O, N and S; a $C_{2-6}$ alkenyl group; a $C_{1-6}$ alkoxy group; or a $C_{7-17}$ aralkyl group, and
a and b each independently represent an integer of 0 to 5; a structural unit represented by formula (2):

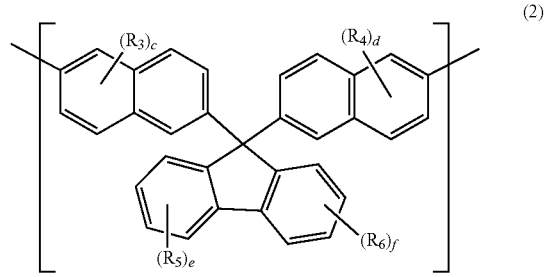

wherein in formula (2),
$R_3$ to $R_6$ each independently represent a hydrogen atom; a fluorine atom; a chlorine atom; a bromine atom; an iodine atom; a $C_{1-6}$ alkyl group; a $C_{6-20}$ aryl group which may contain a heterocyclic atom selected from among O, N and S; a $C_{2-6}$ alkenyl group; a $C_{1-6}$ alkoxy group; or a $C_{7-17}$ aralkyl group,
c and d each independently represent an integer of 0 to 6, and e and f each independently represent an integer of 0 to 4; a structural unit represented by formula (3):

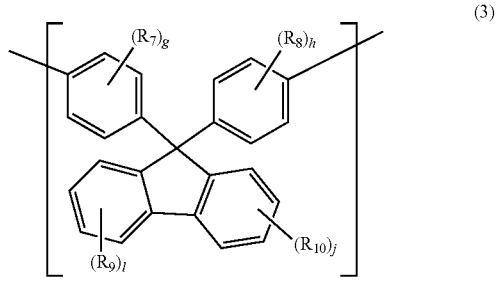

wherein in formula (3),
$R_7$ to $R_{10}$ each independently represent a hydrogen atom; a fluorine atom; a chlorine atom; a bromine atom; an iodine atom; a $C_{1-6}$ alkyl group; a $C_{6-20}$ aryl group which may contain a heterocyclic atom selected from among O, N and S; a $C_{2-6}$ alkenyl group; a $C_{1-6}$ alkoxy group; or a $C_{7-17}$ aralkyl group, and g to j each independently represent an integer of 0 to 4; a structural unit represented by formula (4):

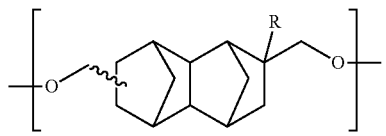

wherein in formula (4), R represents a hydrogen atom or a $C_{1-5}$ alkyl group; and a structural unit represented by formula (5):

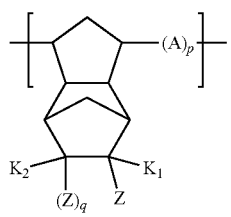

wherein in formula (5), A represents a $C_{1-5}$ alkylene group, p is 0 or 1, $K_1$ represents a hydrogen atom or a $C_{1-5}$ alkyl group, $K_2$ represents a hydrogen atom, a $C_{1-5}$ alkyl group or a $C_{6-20}$ aryl group, Z represents a carboxyl group, an alkoxycarbonyl group, a cycloalkyloxycarbonyl group, an aryloxycarbonyl group, a hydroxyalkylcarbonyl group, a glycidyloxycarbonyl group, a cyano group or an amide group, and q is 0 or 1.

<3> The optical lens according to item <2>, wherein the thermoplastic resin included in the lens part includes all of the structural unit represented by formula (1), the structural unit represented by formula (2) and the structural unit represented by formula (3).

<4> The optical lens according to any one of items <1> to <3>, wherein the lens part and the lens edge part include the same resin.

<5> An optical lens which comprises: a lens part that is an optically effective portion and has a light incidence/emission surface; and a lens edge part that is an optically ineffective portion and has a surface thereof except the light incidence/emission surface, wherein:

the lens edge part includes a non-transparent region in part or all thereof; and the non-transparent region in the lens edge part is obtained by coating the lens edge part with a black material or by carbonizing the lens edge part.

<6> The optical lens according to any one of items <1> to <5>, which is for a smartphone.

<7> An optical lens unit comprising the optical lens according to any one of items <1> to <6>.

<8> The optical lens unit according to item <7>, which does not comprise a spacer.

<9> A method for producing the optical lens according to any one of items <1> to <4>, which comprises integrally molding the lens part and the lens edge part using both insert molding and two-color molding.

Advantageous Effect of the Invention

When an optical lens unit is assembled by using the optical lens of the present invention, wherein a lens part and a lens edge part are integrally molded and the lens edge part has a specific non-transparent region, light leakage in a frame called "barrel" and resolution characteristics can be improved. Further, when the optical lens according to a preferred embodiment of the present invention is used as a lens for smartphones, anti-reflection properties and light-shielding properties are improved, flare and ghost can be suppressed, and a clear image can be obtained.

Moreover, since the lens part and the lens edge part are integrally molded, size reduction of the optical lens unit can be realized, and since it is not required to use a conventional spacer, the production cost can be decreased, and the range of the design of the optical lens unit can be increased. In particular, when the same resin is used for the lens part and the lens edge part, light leakage in a barrel and resolution characteristics are improved more, the antireflection effect is suppressed, and diffused reflection can be suppressed.

BRIEF DESCRIPTION OF THE DRAWINGS

FIG. 1 is a schematic cross sectional view showing the first embodiment of the optical lens of the present invention.

FIG. 2 is a schematic cross sectional view showing the second embodiment of the optical lens of the present invention.

FIG. 3 is a schematic cross sectional view showing the third embodiment of the optical lens of the present invention.

FIG. 4 is a schematic cross sectional view showing the fourth embodiment of the optical lens of the present invention.

FIG. 5 is a schematic cross sectional view showing the fifth embodiment of the optical lens of the present invention.

FIG. 6 is a schematic cross sectional view showing the sixth embodiment of the optical lens of the present invention.

EMBODIMENTS FOR CARRYING OUT THE INVENTION

Hereinafter, preferred embodiments of the optical lens of the present invention will be described in detail with reference to the drawings. Regarding the first embodiment to the sixth embodiment, the same or equivalent components are indicated by the same letter or number.

First Embodiment

As shown in FIG. 1, an optical lens 10 is suitably utilized as a lens for cameras of smartphones, differential scanning calorimeters (DSCs), vehicles, etc. and is small with a diameter of about 1.0 to 20.0 mm, and it is desired to realize further size reduction and higher precision. The diameter is preferably 1.0 to 10.0 mm, and more preferably 3.0 to 10.0 mm. The optical lens 10 is formed by integrally molding a lens part 1 that is an optically effective portion and has a light incidence/emission surface and a lens edge part 2 that is an optically ineffective portion and has a surface thereof except the light incidence/emission surface by means of insert molding. In this regard, "integrally molding" means that a product is formed by integrally molding members simultaneously with jointing thereof, not using secondary bonding or mechanical joint.

In the optical lens 10 of the first embodiment, the lens edge part 2 includes a non-transparent region in all thereof. Regarding the non-transparent region, it is sufficient when it is in a state where it is not transparent. In the first embodiment, in order to provide the non-transparent region, the lens part 1 and the lens edge part 2 include a thermoplastic resin, and the non-transparent region in the lens edge part 2 further contains 0.1 to 5% by mass in total of one or more of a black dye and a black pigment. The total content of one or more of the black dye and the black pigment is preferably 0.5 to 3% by mass, and more preferably 0.5 to 2% by mass.

Specific examples of the black dye include: Sumiplast Black G-2, Sumiplast Black H3B, Sumiplast Black HLG and Sumiplast Black HB manufactured by Sumitomo Chemtex; Black S, Black SF, Black 109 and Black 141 manufactured by Chuo Synthetic Chemical Co., Ltd.; VALIFAST BLACK 1815, VALIFAST BLACK 1821, OIL BLACK 860, NUBIAN BLACK PC-5857, 5877, 5856, NUBIAN BLACK PC-0855, NUBIAN BLACK NH-805, 815 and NUBIAN BLACK TN-870, 877, 807 manufactured by Orient Chemical Industries Co., Ltd.; and Plast Black 8950-N, Plast Black 8970 and Oil Black DA-411 manufactured by Arimoto Chemical Co., Ltd.

Specific examples of the black pigment include: NUBIAN GREY IR-B and OPLAS BLACK 838 manufactured by Orient Chemical Industries Co., Ltd.; and carbon black, in particular, carbon black, wherein the arithmetic mean diameter obtained by observation of carbon black particles using an electron microscope is 5 to 60 nm (preferably 10 to 50 nm) (e.g., SEAST and Aqua Black manufactured by Tokai Carbon Co., Ltd.; BLACK PEARLS, ELFTEX, VULCAN, MOGUL, MONARCH, EMPORER, REGAL, UNITED, SPHERON, STERLING, Shiyou Black, etc. manufactured by Cabot Corporation; HCF, MCF, RCF, LFF and SCF series manufactured by Mitsubishi Chemical Corporation; NITERON and HTC manufactured by NIPPON STEEL Carbon Co., Ltd., etc.).

In the present invention, it is possible to use both the black dye (organic type) and the black pigment (inorganic type), and in this case, these may be directly added and mixed, or a high-concentration product (e.g., about 50%) may be produced as a master batch to be mixed.

According to an example of the method for producing an optical lens 10 of the first embodiment, a resin to be used for a lens part 1 and a resin to be used for a lens edge part 2 are prepared. To the resin to be used for the lens edge part 2, one or more of the black dye and the black pigment are added in a predetermined amount, and it is melted and mixed to prepare a black resin. Next, both insert molding and two-color molding are used for these resins with different colors to integrally mold the lens part 1 and the lens edge part 2. In the optical lens 10 obtained by integral molding, a non-transparent region is included in all of the lens edge part 2.

The lens part of the optical lens of the present invention includes a thermoplastic resin. In particular, it is preferred that the thermoplastic resin includes at least one selected from the group consisting of a structural unit represented by formula (1) below, a structural unit represented by formula (2) below, a structural unit represented by formula (3) below, a structural unit represented by formula (4) below and a structural unit represented by formula (5) below because performances of the optical lens such as a refractive index, Abbe number and Tg are satisfactory in this case.

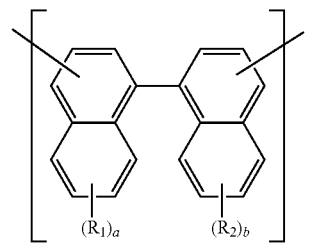

(1)

In formula (1), $R_1$ and $R_2$ each independently represent a hydrogen atom; a fluorine atom; a chlorine atom; a bromine atom; an iodine atom; a $C_{1-6}$ alkyl group; a $C_{6-20}$ aryl group which may contain a heterocyclic atom selected from among O, N and S; a $C_{2-6}$ alkenyl group; a $C_{1-6}$ alkoxy group; or a $C_{7-17}$ aralkyl group, and preferably, each independently represent a substituent selected from the group consisting of a hydrogen atom, a phenyl group, a naphthyl group and substituents shown below:

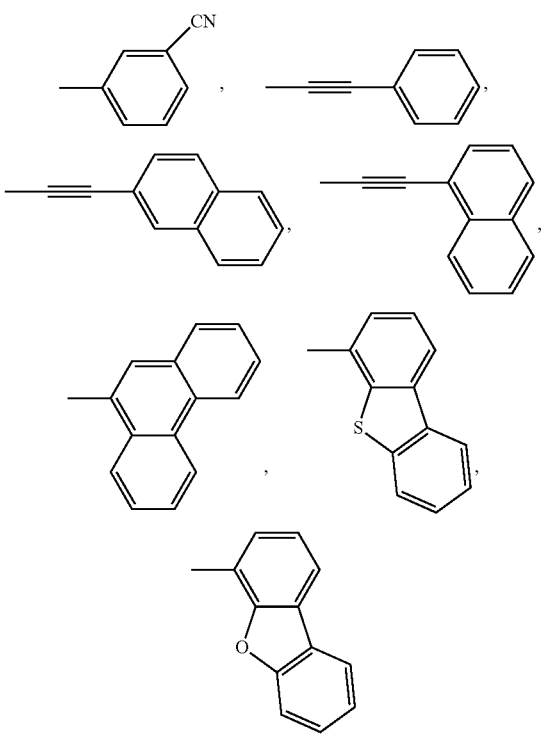

Among them, preferred is a hydrogen atom,

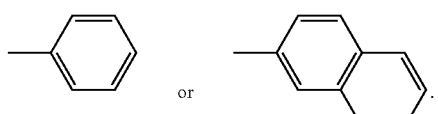

a and b each independently represent an integer of 0 to 5, and preferably, each independently represent 0 or 1.

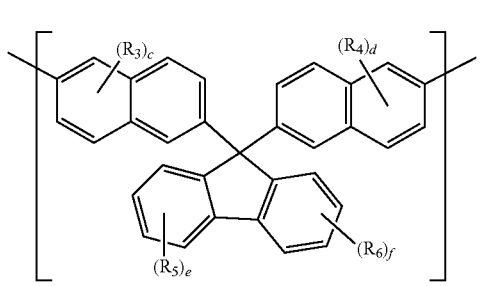

(2)

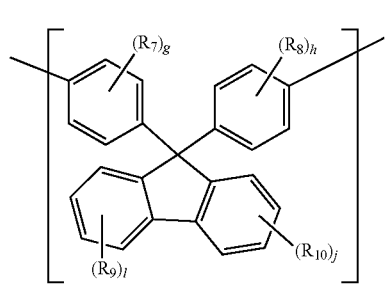

(3)

In formula (2), $R_3$ to $R_6$ each independently represent a hydrogen atom; a fluorine atom; a chlorine atom; a bromine atom; an iodine atom; a $C_{1-6}$ alkyl group; a $C_{6-20}$ aryl group which may contain a heterocyclic atom selected from among O, N and S; a $C_{2-6}$ alkenyl group; a $C_{1-6}$ alkoxy group; or a $C_{7-17}$ aralkyl group, and preferably, each independently represent a substituent selected from the group consisting of a hydrogen atom, a phenyl group, a naphthyl group and substituents shown below:

In formula (3), $R_7$ to $R_{10}$ each independently represent a hydrogen atom; a fluorine atom; a chlorine atom; a bromine atom; an iodine atom; a $C_{1-6}$ alkyl group; a $C_{6-20}$ aryl group which may contain a heterocyclic atom selected from among O, N and S; a $C_{2-6}$ alkenyl group; a $C_{1-6}$ alkoxy group; or a $C_{7-17}$ aralkyl group, and preferably, each independently represent a substituent selected from the group consisting of a hydrogen atom, a phenyl group, a naphthyl group and substituents shown below:

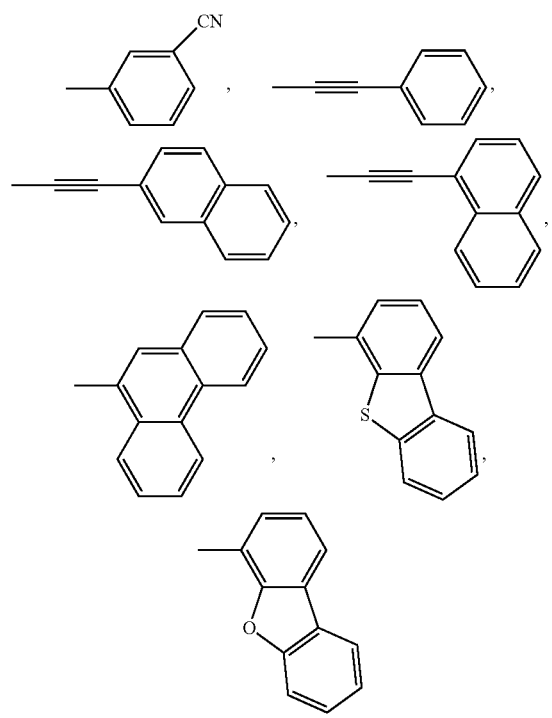

Among them, preferred is a hydrogen atom,

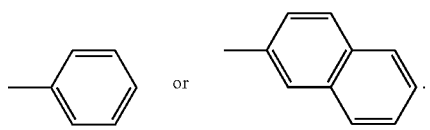

c and d each independently represent an integer of 0 to 6, and preferably, each independently represent 0 or 1. e and f each independently represent an integer of 0 to 4, and preferably, each independently represent 0 or 1.

Among them, preferred is a hydrogen atom,

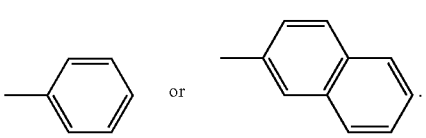

g to j each independently represent an integer of 0 to 4, and preferably, each independently represent 0 or 1.

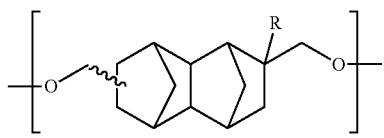

(4)

In formula (4), R represents a hydrogen atom or a $C_{1-5}$ alkyl group, and preferably represents a hydrogen atom.

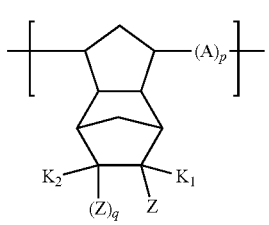

(5)

In formula (5), A represents a $C_{1-5}$ alkylene group, p is 0 or 1, $K_1$ represents a hydrogen atom or a $C_{1-5}$ alkyl group, $K_2$ represents a hydrogen atom, a $C_{1-5}$ alkyl group or a $C_{6-20}$ aryl group, Z represents a carboxyl group, an alkoxycarbonyl group, a cycloalkyloxycarbonyl group, an aryloxycarbonyl group, a hydroxyalkylcarbonyl group, a glycidyloxycarbonyl group, a cyano group or an amide group, and q is 0 or 1. $K_2$ preferably represents a hydrogen atom.

The thermoplastic resin included in the lens part in the optical lens of the present invention preferably includes any one of the structural unit represented by formula (1), the structural unit represented by formula (2), the structural unit represented by formula (3) and the structural unit represented by formula (4). Further, it is preferred that the thermoplastic resin included in the lens part in the optical lens of the present invention includes all of the structural unit represented by formula (1), the structural unit represented by formula (2) and the structural unit represented by formula (3) because optical characteristics such as a refractive index are satisfactory in this case.

Moreover, it is preferred that the lens part and the lens edge part in the optical lens of the present invention include the same resin because in this case, these parts have the same reflectance and as a result, light leakage characteristics and reflection characteristics are satisfactory.

Second Embodiment

As shown in FIG. 2, an optical lens 20 of the second embodiment is the same as the optical lens 10 of the first embodiment except that a lens edge part 2' includes a non-transparent region in part thereof. The shaded area in the lens edge part 2' of the optical lens 20 is the non-transparent region. The ratio of the non-transparent region in the lens edge part 2' is not particularly limited and can be suitably adjusted.

Third Embodiment

As shown in FIG. 3, an optical lens 30 of the third embodiment is the same as the optical lens 20 of the second embodiment except that the shape of a non-transparent region in a lens edge part 2' is different. The shaded area in the lens edge part 2' of the optical lens 30 is the non-transparent region. The shape of the non-transparent region is not particularly limited and can be suitably changed.

Fourth Embodiment

As shown in FIG. 4, an optical lens 40 of the fourth embodiment is the same as the optical lens 30 of the third embodiment except that the shape of a non-transparent region in a lens edge part 2' is different. The shaded area in the lens edge part 2' of the optical lens 40 is the non-transparent region. The shape of the non-transparent region is not particularly limited and can be suitably changed.

Fifth Embodiment

As shown in FIG. 5, an optical lens 50 of the fifth embodiment has a lens part 1 that is an optically effective portion and has a light incidence/emission surface and a lens edge part 2' that is an optically ineffective portion and has a surface thereof except the light incidence/emission surface, the lens edge part 2' includes a non-transparent region in part thereof, and regarding the non-transparent region, the lens edge part 2' is coated with a black material.

Regarding the optical lens 50 of the fifth embodiment, unlike the optical lenses of the first embodiment to the fourth embodiment, the lens part and the lens edge part are not required to be integrally molded.

The black material is not particularly limited as long as it can be uniformly applied to the lens edge part, and a commercially-available liquid sumi, black paint or black dye, for example, a jet-black dye NUBIAN BLACK PC-8550 manufactured by Orient Chemical Industries Co., Ltd. can be used.

Examples of the method for coating with the black material include application, spray and immersion using the black material.

The resin to be used for the lens part 1 of the optical lens 50 is not particularly limited, but the resin explained with respect to the optical lens 10 of the first embodiment can be preferably used.

Sixth Embodiment

As shown in FIG. 6, an optical lens 60 of the sixth embodiment is the same as the optical lens 50 of the fifth embodiment except that a non-transparent region in a lens edge part 2' is obtained by carbonizing the lens edge part 2'.

Examples of the method for carbonizing the lens edge part 2' of the optical lens 60 include a method for forming a carbide by heating, burning or the like, a method using a strong dehydration reaction with sulfuric acid or the like and a method using laser light irradiation.

Optical Lens Unit

The optical lens unit of the present invention comprises the optical lens of the present invention described above. The optical lens unit of the present invention is not required to comprise a spacer. For this reason, thickness reduction and size reduction can be realized, and light leakage due to reflected light at the interface can be reduced.

According to an example of the method for producing the optical lens unit of the present invention, 4 optical lenses of the present invention are stacked and put into a barrel for optical lenses, thereby preparing the optical lens unit.

EXAMPLES

Hereinafter, the present invention will be specifically described by way of illustrative examples, but the present invention is not limited thereto. Characteristics of optical lenses obtained were evaluated as described below.

Light Leakage Characteristics

Light leakage in a barrel was evaluated by visual observation. The case where light leakage was not observed was rated as A, the case where almost no light leakage was observed was rated as B, the case where light leakage was slightly observed was rated as C, and the case where light leakage was significantly observed was rated as D. A and B are regarded as acceptable.

Resolution Characteristics 4 optical lenses obtained were stacked and put into a barrel for optical lenses to prepare an optical lens unit. Evaluation was made by visual observation. The case where blur of a projected character was not observed was rated as A, the case where almost no blur was observed was rated as B, the case where blur was slightly observed was rated as C, and the case where blur was significantly observed was rated as D. A and B are regarded as acceptable.

Example 1

The below-described resin A and resin B were prepared.

<Preparation of Resin A>

As raw materials, 8.0 kg (14.85 mol) of 9,9-bis[6-(2-hydroxyethoxy)naphthalen-2-yl]fluorene represented by structural formula (i) below, 7.5 kg (20.03 mol) of 2,2'-bis (2-hydroxyethoxy)-1,1'-binaphthalene represented by structural formula (ii) below, 7.5 kg (12.70 mol) of 9,9-bis[4-(2-hydroxyethoxy)-3-phenylphenyl]fluorene represented by structural formula (iii) below, 10.5 kg (49.02 mol) of diphenyl carbonate and 16 ml of $2.5 \times 10^{-2}$ mol/l sodium hydrogen carbonate solution ($4.0 \times 10^{-4}$ mol, that is, $8.4 \times 10^{-6}$ mol relative to 1 mol of the total of dihydroxy compounds) were put into a 50 L reactor equipped with a stirrer and a distillation apparatus, and it was heated to 180° C. under nitrogen atmosphere (760 mmHg). 30 minutes after the start of heating, complete dissolution of the raw materials was confirmed. After that, stirring was performed for 120 minutes under the same conditions. After that, the pressure reducing degree was adjusted to 200 mmHg, and simultaneously, the temperature was increased to 200° C. at a rate of 60° C./hr. During this, the start of distillation of by-produced phenol was confirmed. After that, the temperature was kept at 200° C. for 20 minutes to perform a reaction. Further, the temperature was increased to 230° C. at a rate of 75° C./hr, and 10 minutes after the end of the increase of the temperature, the temperature was kept while the pressure reducing degree was adjusted to 1 mmHg or less over 2 hours. After that, the temperature was increased to 245° C. at a rate of 60° C./hr, and stirring was carried out for 40 minutes. After the reaction was completed, nitrogen was introduced into the reactor to adjust the pressure to ordinary pressure, and a polycarbonate resin (resin A) produced was pelletized and taken out therefrom. Note that the obtained resin A includes all of the structural unit represented by formula (1), the structural unit represented by formula (2) and the structural unit represented by formula (3).

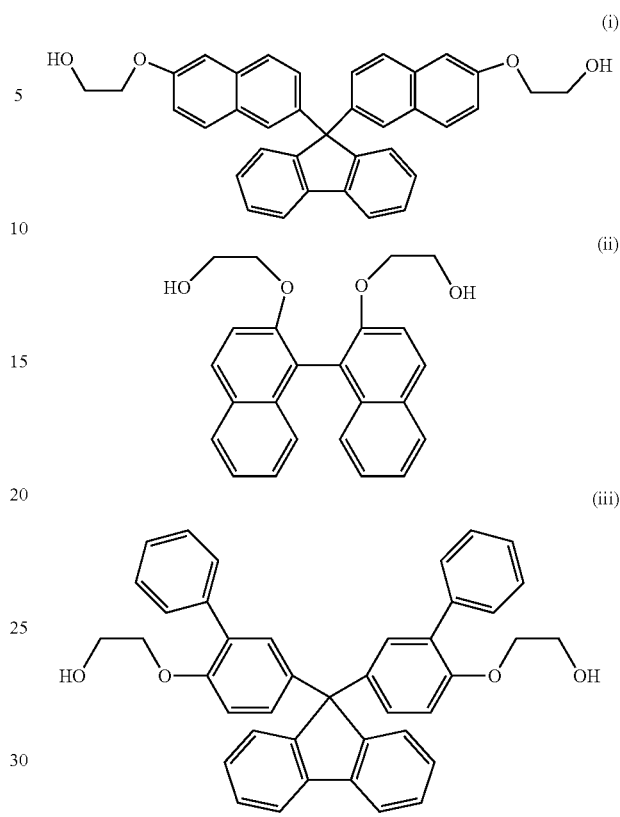

<Preparation of Resin B>

10 kg of the resin A obtained above and 100 g of a resin coloring agent (manufactured by Orient Chemical Industries Co., Ltd., trade name: NUBIAN BLACK PC-5857) as a black dye were melt-mixed using a twin screw extruder to prepare a resin B.

<Preparation of Optical Lens and Optical Lens Unit>

The resin A and the resin B described above were respectively heated and dried at 100° C. for 3 hours. After that, the resins were subjected to both insert molding and two-color molding in a manner such that the resin A was formed to be a lens part and the resin B was formed to be a lens edge part, thereby obtaining an optical lens. 4 optical lenses obtained were stacked and put into a barrel for optical lenses to prepare an optical lens unit. Physical properties of the obtained optical lens unit are shown in Table 1.

Example 2

<Preparation of Resin B-1>

10 kg of the resin A obtained above and 100 g of a carbon black (MCF series #1000 manufactured by Mitsubishi Chemical Corporation) as a black pigment were melt-mixed using a twin screw extruder to prepare a resin B-1.

Optical lenses were prepared and then an optical lens unit was prepared in a manner similar to that in Example 1, except that the resin B-1 was used instead of the resin B. Physical properties of the obtained optical lens unit are shown in Table 1.

Example 3

The below-described resin C was prepared.
<Preparation of Resin C>

10 kg of a polycarbonate resin (trade name: Iupilon S-3000R) manufactured by Mitsubishi Gas Chemical Company, Inc. and 100 g of a resin coloring agent (manufactured by Orient Chemical Industries Co., Ltd., trade name: NUBIAN BLACK PC-5857) as a black dye were melt-mixed using a twin screw extruder to prepare a resin C.

Optical lenses were prepared and then an optical lens unit was prepared in a manner similar to that in Example 1, except that the resin C was used instead of the resin B. Physical properties of the obtained optical lens unit are shown in Table 1.

Comparative Example 1

Optical lenses were obtained in a manner similar to that in Example 1, except that the resin A was used instead of the resin B. 4 optical lenses obtained were stacked and put into a barrel for optical lenses to prepare an optical lens unit. Physical properties of the obtained optical lens unit are shown in Table 1. Regarding the obtained optical lenses, since the same resin A was used for the lens parts and the lens edge parts, two-color molding was not performed. Further, the lens edge parts do not include a non-transparent region in part or all thereof.

Comparative Example 2

4 optical lenses obtained in Comparative Example 1 with a light-shielding material (trade name: SOMABLACK) manufactured by Somar Corporation being sandwiched between spacer portions of the lenses were put into a barrel for optical lenses to prepare an optical lens unit. Physical properties of the obtained optical lens unit are shown in Table 1.

TABLE 1

|  | Example 1 | Example 2 | Example 3 | Comparative Example 1 | Comparative Example 2 |
|---|---|---|---|---|---|
| Lens part | Resin A | Resin A | Resin A | Resin A | Resin A |
| Lens edge part | Resin B | Resin B-1 | Resin C | Resin A | Resin A |
| Spacer | Absent | Absent | Absent | Absent | Present |
| Light leakage characteristics | A | A | B | D | D |
| Resolution characteristics | A | A | B | C | C |

Example 4

The below-described resin D was prepared.
<Preparation of Resin D>

23.50 kg (105.7 mol) of D-NDM represented by structural formula (a) below, wherein the mass ratio between the isomer of 2,6-position and the isomer of 2,7-position was 50:50, 22.98 kg (107.3 mol) of diphenyl carbonate and 0.13 g ($1.5 \times 10^{-3}$ mol) of sodium hydrogencarbonate were put into a 50 L reactor equipped with a stirrer and a distillation apparatus, and it was heated to 205° C. over 1 hour under nitrogen atmosphere (760 Torr) and stirred. The pressure was adjusted to 205 Torr over 30 minutes, and under conditions of 205° C. and 205 Torr, the mixture was kept for 30 minutes, and a transesterification reaction was initiated. 30 minutes later, the pressure was reduced from 205 Torr to 180 Torr over 20 minutes. The temperature was increased to 215° C. while reducing the pressure. The temperature was increased to reach 230° C. and the pressure was reduced to be 150 Torr 120 minutes after the initiation of the reaction. The temperature was increased to reach 240° C. and the pressure was reduced to be 1 Torr 180 minutes after the initiation of the reaction. After that, it was kept for 20 minutes and pelletized, thereby obtaining a polycarbonate resin (homo type of D-NDM, D-1).

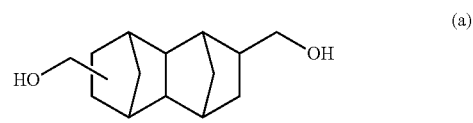

(a)

20.0 kg (45.6 mol) of 9,9-bis[4-(2-hydroxyethoxy)phenyl]fluorene (BPEF) represented by structural formula (b) below, 10.16 kg (47.4 mol) of diphenyl carbonate and 0.03 g ($3.6 \times 10^{-4}$ mol) of sodium hydrogencarbonate were put into a 50 L reactor equipped with a stirrer and a distillation apparatus, and it was heated to 205° C. over 1 hour under nitrogen atmosphere (760 Torr) and stirred. The pressure was adjusted to 205 Torr over 20 minutes, and under conditions of 205° C. and 205 Torr, the mixture was kept for 30 minutes, and a transesterification reaction was initiated. 30 minutes later, the pressure was reduced from 205 Torr to 180 Torr over 20 minutes. The temperature was increased to 215° C. while reducing the pressure. The temperature was increased to reach 230° C. and the pressure was reduced to be 150 Torr 120 minutes after the initiation of the reaction. The temperature was increased to reach 240° C. and the pressure was reduced to be 1 Torr 180 minutes after the initiation of the reaction. After that, it was kept for 20 minutes and pelletized, thereby obtaining a polycarbonate resin (D-2).

10.0 kg of the pelletized polycarbonate resin (D-1) obtained using D-NDM as a raw material was mixed with 4.8 kg of the pelletized polycarbonate resin (D-2) obtained using BPEF as a raw material, and to the mixture, 14.8 g of a hindered phenol-based antioxidant (AO-60 manufactured by ADEKA), 4.4 g of a phosphite-based antioxidant (trade name: PEP-36) and 14.8 g of glycerin monostearate (S-100A manufactured by Riken Vitamin Co., Ltd.) as a mold release agent were added. The mixture was kneaded and pelletized using a twin screw extruder (IPEC-35), thereby obtaining a polycarbonate resin D. Note that the obtained resin D includes the aforementioned structural unit represented by formula (4).

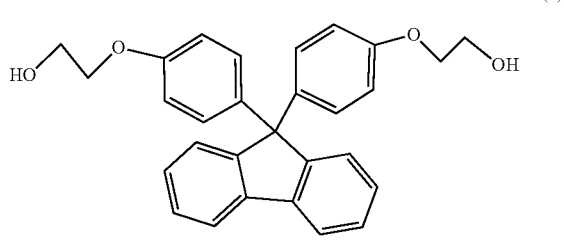

(b)

The below-described resin E was prepared.
<Preparation of Resin E>
10 kg of the resin D obtained above and 100 g of a resin coloring agent (manufactured by Orient Chemical Industries Co., Ltd., trade name: NUBIAN BLACK PC-5857) as a black dye were melt-mixed using a twin screw extruder to prepare a resin E.
<Preparation of Optical Lens and Optical Lens Unit>
The resin D and the resin E described above were respectively heated and dried at 100° C. for 3 hours. After that, the resins were subjected to both insert molding and two-color molding in a manner such that the resin D was formed to be a lens part and the resin E was formed to be a lens edge part, thereby obtaining an optical lens. 4 optical lenses obtained were stacked and put into a barrel for optical lenses to prepare an optical lens unit. Physical properties of the obtained optical lens unit are shown in Table 2.

Example 5

The below-described resin F was prepared.
<Preparation of Resin F>
A thermoplastic resin F was obtained in a manner similar to that with respect to the resin A of Example 1, except that, as raw materials, 4.53 kg (12.1 mol) of 2,2'-bis(2-hydroxyethoxy)-1,1'-binaphthalene represented by structural formula (c) below, 8.72 kg (14.8 mol) of 9,9-bis(4-(2-hydroxyethoxy)-3-phenylphenyl)fluorene represented by structural formula (d) below, 5.99 kg (27.9 mol) of DPC and 16 ml of $2.5 \times 10^{-4}$ mol/l sodium hydrogen carbonate solution ($4.0 \times 10^{-4}$ mol, that is, $8.4 \times 10^{-6}$ mol relative to 1 mol of the total of dihydroxy compounds) were used. Note that the obtained resin F includes the aforementioned structural unit represented by formula (1) and the aforementioned structural unit represented by formula (3).

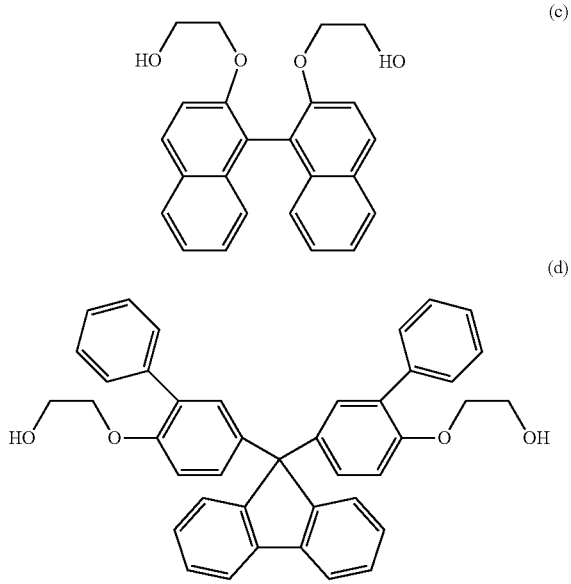

The below-described resin G was prepared.
<Preparation of Resin G>
10 kg of the resin F obtained above and 100 g of a resin coloring agent (manufactured by Orient Chemical Industries Co., Ltd., trade name: NUBIAN BLACK PC-5857) as a black dye were melt-mixed using a twin screw extruder to prepare a resin G.

<Preparation of Optical Lens and Optical Lens Unit>
The resin F and the resin G described above were respectively heated and dried at 100° C. for 3 hours. After that, the resins were subjected to both insert molding and two-color molding in a manner such that the resin F was formed to be a lens part and the resin G was formed to be a lens edge part, thereby obtaining an optical lens. 4 optical lenses obtained were stacked and put into a barrel for optical lenses to prepare an optical lens unit. Physical properties of the obtained optical lens unit are shown in Table 2.

TABLE 2

|  | Example 4 | Example 5 |
| --- | --- | --- |
| Lens part | Resin D | Resin F |
| Lens edge part | Resin E | Resin G |
| Spacer | Absent | Absent |
| Light leakage characteristics | A | A |
| Resolution characteristics | A | A |

INDUSTRIAL APPLICABILITY

By using the optical lens of the present invention, thickness reduction and size reduction of the optical lens unit can be realized, and light leakage due to reflected light at the interface can be reduced. The present invention can be suitably used as a lens for cameras of smartphones, differential scanning calorimeters (DSCs), vehicles, etc.

EXPLANATIONS OF LETTERS OR NUMERALS 1 lens part
2 lens edge part (including non-transparent region in all thereof)
2' lens edge part (including non-transparent region in part thereof)
10, 20, 30, 40, 50, 60 optical lens
The invention claimed is:
1. An optical lens formed by integrally molding a lens part that is an optically effective portion and has a light incidence/emission surface, and a lens edge part that is an optically ineffective portion and has a surface thereof except the light incidence/emission surface, wherein:
the lens edge part includes a non-transparent region in part or all thereof;
the lens part and the lens edge part include a thermoplastic resin; and
the non-transparent region in the lens edge part comprises 0.1 to 5% by mass in total of one or more of a black dye and a black pigment wherein the thermoplastic resin included in the lens part includes at least one selected from the group consisting of: a structural unit represented by formula (1):

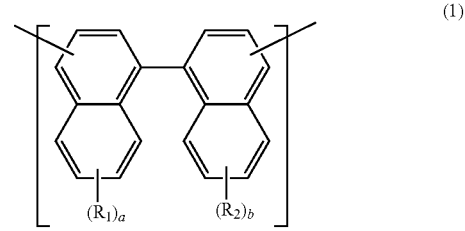

wherein in formula (1),

R$_1$ and R$_2$ each independently represent a hydrogen atom; a fluorine atom; a chlorine atom; a bromine atom; an iodine atom; a C$_{1-6}$ alkyl group; a C$_{6-20}$ aryl group which may contain a heterocyclic atom selected from among O, N and S; a C$_{2-6}$ alkenyl group; a C$_{1-6}$ alkoxy group; or a C$_{7-17}$ aralkyl group, and a and b each independently represent an integer of 0 to 5; a structural unit represented by formula (2):

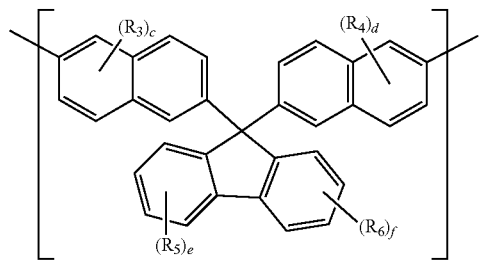

(2)

wherein in formula (2),

R$_3$ to R$_6$ each independently represent a hydrogen atom; a fluorine atom; a chlorine atom; a bromine atom; an iodine atom; a C$_{1-6}$ alkyl group; a C$_{6-20}$ aryl group which may contain a heterocyclic atom selected from among O, N and S; a C$_{2-6}$ alkenyl group; a C$_{1-6}$ alkoxy group; or a C$_{7-17}$ aralkyl group, c and d each independently represent an integer of 0 to 6, and e and f each independently represent an integer of 0 to 4; a structural unit represented by formula (3):

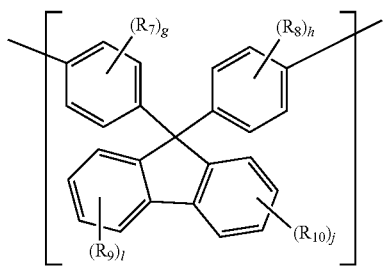

(3)

wherein in formula (3),

R$_7$ to R$_{10}$ each independently represent a hydrogen atom; a fluorine atom; a chlorine atom; a bromine atom; an iodine atom; a C$_{1-6}$ alkyl group; a C$_{6-20}$ aryl group which may contain a heterocyclic atom selected from among O, N and S; a C$_{2-6}$ alkenyl group; a C$_{1-6}$ alkoxy group; or a C$_{7-17}$ aralkyl group, and g to j each independently represent an integer of 0 to 4; a structural unit represented by formula (4):

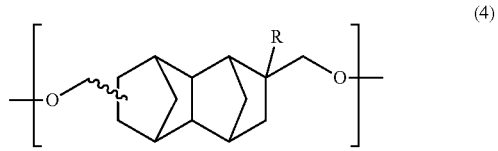

(4)

wherein in formula (4), R represents a hydrogen atom or a C$_{1-5}$ alkyl group; and a structural unit represented by formula (5):

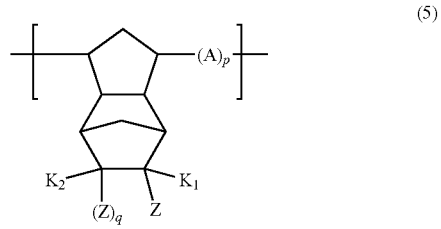

(5)

wherein in formula (5), A represents a C$_{1-5}$ alkylene group, p is 0 or 1, K$_1$ represents a hydrogen atom or a C$_{1-5}$ alkyl group, K$_2$ represents a hydrogen atom, a C$_{1-5}$ alkyl group or a C$_{6-20}$ aryl group, Z represents a carboxyl group, an alkoxycarbonyl group, a cycloalkyloxycarbonyl group, an aryloxycarbonyl group, a hydroxyalkylcarbonyl group, a glycidyloxycarbonyl group, a cyano group or an amide group, and q is 0 or 1.

2. The optical lens according to claim 1, wherein the thermoplastic resin included in the lens part comprises all of the structural unit represented by formula (1), the structural unit represented by formula (2) and the structural unit represented by formula (3).

3. The optical lens according to claim 1, wherein the lens part and the lens edge part include the same resin.

4. The optical lens according to claim 1, which is for a smartphone.

5. An optical lens unit comprising the optical lens according to claim 1.

6. The optical lens unit according to claim 5, which does not comprise a spacer.

7. A method for producing the optical lens according to claim 1, which comprises integrally molding the lens part and the lens edge part using both insert molding and two-color molding.

* * * * *